United States Patent
Tominaga et al.

[11] Patent Number: 5,418,030
[45] Date of Patent: May 23, 1995

[54] OPTICAL RECORDING MEDIUM AND METHOD FOR MAKING

[75] Inventors: Junji Tominaga, Nagano; Susumu Haratani, Tokyo; Tokuhiko Handa, Nagano, all of Japan

[73] Assignee: TDK Corporation, Tokyo, Japan

[21] Appl. No.: 74,447

[22] Filed: Jun. 10, 1993

[30] Foreign Application Priority Data

Jun. 12, 1992 [JP] Japan .................. 4-179267
Jan. 8, 1993 [JP] Japan .................. 5-017968

[51] Int. Cl.⁶ .............................. B32B 3/00
[52] U.S. Cl. .............................. 428/64; 428/65; 428/457; 428/913; 430/270; 430/945; 346/76 L; 346/135.1; 347/264
[58] Field of Search ........... 428/64, 65, 457, 913; 430/270, 945; 346/76 L, 135.1

[56] References Cited

U.S. PATENT DOCUMENTS

| | | | |
|---|---|---|---|
| 4,906,556 | 7/1989 | Nishikawa et al. | 428/64 |
| 4,956,213 | 9/1990 | Masuda | 428/64 |
| 5,093,174 | 3/1992 | Suzuki et al. | 428/64 |
| 5,095,479 | 3/1992 | Harigaya et al. | 369/288 |
| 5,171,618 | 12/1992 | Suzuki | 428/64 |

FOREIGN PATENT DOCUMENTS

| | | |
|---|---|---|
| 3832126A1 | 3/1989 | Germany . |
| 60-61137 | 9/1986 | Japan . |
| 60-112420 | 11/1986 | Japan . |
| 60-159663 | 1/1987 | Japan . |
| 60-211470 | 4/1987 | Japan . |
| 870021439 | 12/1988 | Japan . |
| 62-259708 | 4/1989 | Japan . |
| 63-214851 | 3/1990 | Japan . |
| 63-214852 | 3/1990 | Japan . |

*Primary Examiner*—Patrick J. Ryan
*Assistant Examiner*—Elizabeth Evans
*Attorney, Agent, or Firm*—Watson, Cole, Grindle & Watson

[57] ABSTRACT

In an optical recording medium comprising a recording layer on a substrate, the recording layer contains a recording material which consists essentially of A, B, C, MI, and MII wherein A is Ag and/or Au, B is In, C is Te and/or Se, MI is Sb and/or Bi, and MII is at least one element selected from the group consisting of Ti, Zr, Hf, V, Nb, Ta, Mn, W and Mo, the atomic ratio of the respective elements being represented by the formula:

$$[(A_a B_b C_{1-a-b})_x MI_{1-x}]_{1-y} MII_y$$

wherein $0.01 \leq a < 0.50$, $0.01 \leq b < 0.50$, $0.30 \leq x \leq 0.70$, and $0.001 \leq y \leq 0.20$. Information is recorded and erased by exposing the recording layer to a light beam for causing the recording layer to change its crystallographic state. The invention improves C/N and repetitive recording performance at a low linear velocity of the recording layer relative to the light beam and enables reproduction in accordance with the CD standard.

11 Claims, 2 Drawing Sheets

OPTICAL RECORDING MEDIUM AND METHOD FOR MAKING

BACKGROUND OF THE INVENTION

This invention relates to an optical recording medium applied to record and erase information by use of a recording layer changing its crystallographic state, and a method for preparing the same.

Recently, a variety of recording media have been proposed with high recording density and rewritable properties. One typical rewritable optical recording medium is of phase change type wherein laser light is directed to the recording layer to change its crystallographic phase whereby a change of reflectivity with such a crystallographic transition is detected. Optical recording media with the phase change materials have been gradually attractive because of not only the capability of a single beam overwriting, but also a relatively simple optical system as compared with magnetooptical recording system.

Ge-Te or Ge-Te-Sb have been widely used as the phase change materials, because of providing a wide reflectivity change between the crystalline and amorphous states and the materials show good durability. It has been recently proposed to use new compounds known as chalcopyrites. Chalcopyrite type compounds have been investigated as compound semiconductor materials for years and have been applied to solar batteries and so on. The chalcopyrite type compounds are composed of Ib-IIIb-VIb$_2$ or IIb-IVb-Vb$_2$ of the Periodic Table and the compounds have two stacked diamond structures. The basic characteristics are well described, for example, in "Physics", Vol. 8, No. 8 (1987), pp. 441 and Electrochemistry, Vol. 56, No. 4 (1988), pp. 228.

H. Iwasaki et al have mixed one of the typical chalcopyrite, Ag-In-Te$_2$ with Sb or Bi and applied these compound alloys to optical memory recording at a liner velocity of 7 m/s. See Japanese Patent Application Kokai (JP-A) No. 240590/1991, 99884/1991, 82593/1991, and 73384/1991. More particularly, JP-A 240590/1991 discloses an information recording medium having a recording layer predominantly comprising $(AgInTe_2)_{1-a}M_a$ wherein M is Sb and/or Bi and $0.30 \leq a \leq 0.92$ and having a mixture of AgInTe$_2$ and M phases. The alleged advantages include improvements in laser writing sensitivity, complete erasability, overwriting properties and the erasing ratio.

Optical recording disks which can be recorded and reproduced especially at the same linear velocity (1.2 to 1.4 m/s) of the present compact disk (CD) have been greatly interested because of sharing the same drive unit of the present CD by adjusting or modifying the optical system. write-once disks of this type have been developed by use of an organic dyes film as the recording material. However, rewritable one has not been proposed nor developed yet. The above-mentioned optical recording disks with the optical phase change have been expected well for this application because of its good erasability and unnecessity of a complicated drive system like magneto-optical system.

In Example of JP-A 240590/1991 referred to above, signals were recorded, while rotating the disk at a linear velocity of 7 m/s. However, when we tried to reduce the linear velocity to that used in CD with the same structured disk, C/N ratio dropped so rapidly and showed poor repetition of overwriting in comparison with the obtained properties at 7.0 m/s. This means that the film composition claimed in the above-mentioned application shows superb properties on recording and erasability at 7.0 m/s, however, the crystallization time of the film does not fit to the recording at a linear velocity of 1.4 m/s, because the crystallization time mostly depends on the alloy composition. Also the crystallization time relies on the disk structure. It is necessary to apply so called "a rapidly cooling strucutre", to solidify the amorphous state after the melting by the incident laser power.

This strucuture has already been known well, for example in Jpn. J. Appl. Phys. vol. 31(1992) pp 476–481. In this structure, a metal reflector with highly thermal conductivity is closely placed on a recording layer separated by a thinner dielectric film in order to cool down and solidify quickly to the amorphous state after the melting. A recorded mark is mostly solidified with a clear shape or contrast to the other area unrecorded, which is the crystalline state.

SUMMARY OF THE INVENTION

Therefore, the problems which can not record and overwrite well would be overcome by use of the rapidly cooling structure and change the material composition with such a slower eigen crystallization time.

That is, an object of the present invention is to provide a novel and improved optical recording medium of the phase change type having a recording layer of a (Ag,Au)In(Te,Se)$_2$-(Sb,Bi) system belonging to the chalcopyrite type wherein the crystallization time or speed of the recording layer is slowered, thereby improving C/N and repetitive recording capability upon movement of the recording layer relative to a light beam at a relatively low speed around 1.2 to 1.4 m/s.

Another object of the present invention is to provide a novel and improved optical recording medium of the phase change type capable of reproduction compatible with the CD standard.

The present invention provides an optical recording medium comprising a recording layer on a substrate wherein information is recorded and erased by exposing the recording layer to a light beam for causing the recording layer to change its crystallographic state. The recording layer comprises a recording material containing, preferably consisting essentially of A, B, C, MI, and MII wherein A is at least one of silver and gold, B is indium, C is at least one of tellurium and selenium, MI is at least one of antimony and bismuth, and MII is at least one element selected from the group consisting of titanium, zirconium, hafnium, vanadium, niobium, tantalum, manganese, tungsten and molybdenum, the atomic ratio of the respective elements in the recording material being represented by the formula:

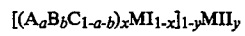

wherein letters a, b, x and y are in the ranges: $0.01 \leq a < 0.50$, $0.01 \leq b < 0.50$, $0.30 \leq x \leq 0.70$, and $0.001 \leq y \leq 0.20$.

Preferably, the optical recording medium has on the substrate, a lower dielectric layer, the recording layer, an upper dielectric layer, a reflective layer, and a protective layer in the described order. The lower dielectric layer includes at least one laminate consisting of two dielectric laminae having different refractive index. The dielectric lamina having a higher refractive index in the laminate is disposed adjacent to the substrate. In the laminate, one dielectric lamina has refractive index of at least 2 and the other dielectric lamina has a refractive index of less than 2 as measured over a light wavelength of 400 to 850 nm. The upper dielectric layer has a refractive index of at least 2 as measured at a wavelength of 400 to 850 nm.

In one preferred embodiment, the recording layer further contains a dielectric material which has a refractive index of at least 1.4 as measured over a light wavelength of 400 to 850 nm. In this recording layer, the recording material is at least 50% by volume of the recording material and the rest is the dielectric material combined. The recording layer can be formed on a substrate by a multiple source sputtering technique using a target of the recording material and a target of the dielectric material, while rotating the substrate at a rotational speed of 1 to 10 rpm relative to the respective targets.

BENEFITS OF THE INVENTION

Surprisingly, the crystallization speed or time of a (Ag,Au)In(Te,Se)$_2$-(Sb,Bi) system composition is substantially reduced by adding MII thereto. Then the present invention, when applied to optical recording disks to be operated at a relatively low linear velocity around 1.2 to 1.4 m/s, achieves satisfactory C/N and improves repetitive recording capability, especially one beam direct overwriting cpability.

As described in JP-A 240590/1991 and 73384/1991, it was believed that (Ag,Au)In(Te,Se)$_2$-(Sb,Bi) systems change their reflectivity through microcrystalline-coarse crystal transition or crystalline-amorphous transition as found in the chalcopyrite or zincblende type structure. It is believed that the addition of MII according to the present invention prolongs the crystallization speed or time by retarding a change of crystallographic structure.

In the embodiment wherein the recording layer is formed of a mixture of a recording material and a dielectric material, modulation is substantially improved since the reflectivity of amorphous state and the ratio of the reflectivity of the crystalline state and that of the armorphous is substantially lowered. This is because the recording layer mixed with dielectric material can decrease light absorption coefficient even when the layer is a few times thicker than that of the recording material itself. Typically the recording material has a real part of a refractive index n of from about 4 to about 6 (4 in amorphous state and 6 in crystalline state) and the imaginary part of the index k of from about 2.2 to about 3.3 (2.2 in amorphous state and 3.3 in crystalline state) while the dielectric material has a relatively lower refractive index n of about 1.4 to about 2.7. Where the recording layer is made of the recording material mixed with dielectric material, the imaginary part of the index k drastically or exponentially decreases when the mixing ratio of dielectric material to the recording material is increased though the real part of refractive index n monotonieally decreases thereo, resulting in the recording layer having a considerably decreased percent light absorption per unit thickness. This property is very applicable to enhance the phase difference effect of reflected light, resulting in the reflectivity difference between the crystalline or microcrystalline and amorphous states. Consequently, the modulation becomes larger.

The optical recording medium of the invention generally has on the substrate, a lower dielectric layer, a recording layer, an upper dielectric layer, a reflective layer, and a protective resin layer in the described order. Where the lower dielectric layer includes a laminate of a high refractive index of lamina and a lower refractive index lamina, in this case, the reflectivity is superb, or greatly improved to accommodate for standard CD reproduction.

DETAILED DESCRIPTION OF THE INVENTION

Figure 1:
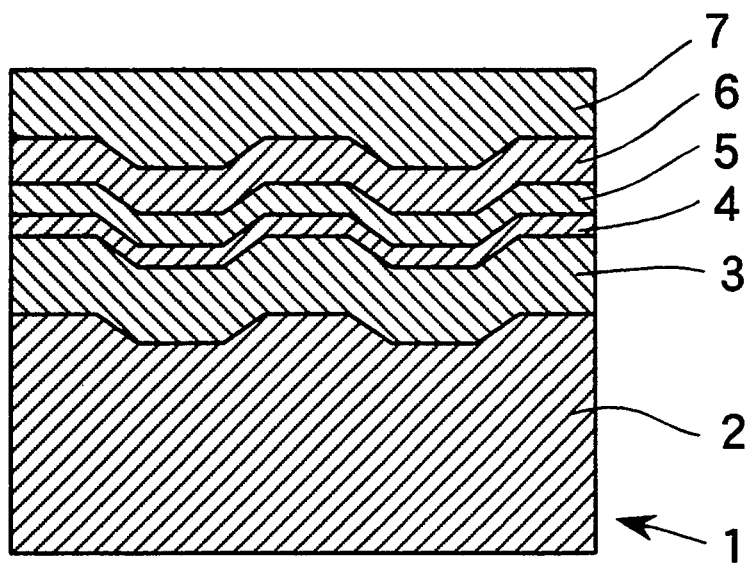
FIG. 1 is a fragmental cross-sectional view of an optical recording medium according to one preferred embodiment of the invention.

The optical recording medium of the invention is of the type comprising a recording layer on a substrate wherein information is recorded and erased by radiating the recording layer by a light beam for causing a recording material in the recording layer to change between its two crystallographic states, reversibly. The recording material of which the recording layer is made contains A, B, C, MI, and MII wherein A is silver and/or gold, B is indium, C is tellurium and/or selenium, MI is antimony and/or bismuth, and MII is at least one element selected from the group consisting of titanium, zirconium, hafnium, vanadium, niobium, tantalum, manganese, tungsten and molybdenum. The atomic ratio of the respective elements in the recording material is represented by the formula:

$$[(A_a B_b C_{1-a-b})_x MI_{1-x}]_{1-y} MII_y$$

wherein letters a, b, x and y are in the ranges:
 $0.01 \leq a < 0.50$, preferably $0.20 \leq a < 0.40$,
 $0.01 \leq b < 0.50$, preferably $0.03 \leq b < 0.20$,
 $0.30 \leq x \leq 0.70$, preferably $0.40 \leq x \leq 0.60$, and
 $0.001 \leq y \leq 0.20$, preferably $0.001 \leq y \leq 0.01$.

Elements A, B and C are preferably contained in the stoichiometric composition of chalcopyrite type compounds, that is, in the proportion of $ABC_2$, but may deviate therefrom as represented by $A_a B_b C_{1-a-b}$ in the above formula. With a and b outside the above-defined ranges, the phase change produces an insufficient change of reflectivity. With x below the above-defined range, the crystal transition rate or the crystallization speed or time becomes so high that no satisfactory C/N would be achieved at a low linear velocity of about 1.2 to 2.8 m/s. With x beyond the above-defined range, the phase change cannot make a sufficient reflectivity difference, either.

When y representative of the amount of MII is below the above-defined range, the crystallization speed or time becomes so high that no satisfactory C/N would be achieved when long time signals such as 11T signals are recorded at a low linear velocity and the repetitive recording times is decreased. When y is beyond the above-defined range, recording characteristics become too poor to obtain a sufficient contrast of signals. Among MII elements, titanium and vanadium, especially Ti is more effective for reducing the crystallization speed or time. However, for improving reliability under severe enviromental conditions, such as high temperature and high humidity, vanadium and titanium, especially V are more effective. Accordingly, it is preferred that at least one of titanium and vanadium, especially V occupy at least 80 at %, especially 100 at % of the total of MII elements. The proportion of antimony and bismuth as MI elements is not critical.

In addition to the above-mentioned elements, the recording layer may further contain a trace amount of impurities such as Cu, Ni, Zn, Fe, 0, N and C, preferably in a total amount of 0.05 at % or less.

In one preferred embodiment, the recording layer contains not only the recording material, but also a dielectric material. The dielectric material contained in the recording layer is not critical and may be selected from various transparent ceramics including silicon oxide such as $SiO_2$, silicon nitride such as $Si_3N_4$, zinc sulfide such as ZnS, and mixtures thereof, and various species of glass. Also useful are so-called LaSiON materials containing La, Si, O and N, so-called SiAlON materials containing Si, Al, O and N, and yttrium-containing SiAlON materials. Preferred dielectric materials have a refractive index of at least 1.4, especially at least 2 over the wavelength range of 400 to 850 nm. This wavelength range includes 780 nm which is the wavelength normally used in current CD players and represents the range over which the optical recording medium of the invention is advantageously operated for writing. Preferred examples of the dielectric material are a mixture of ZnS and $SiO_2$, a mixture of ZnS and $Si_3N_4$, and a mixture of ZnS and $Ta_2O_5$. Preferably the recording layer contains the recording material and the dielectric material such that the recording material is at least 50% by volume, especially 60 to 80% by volume of the recording material and the dielectric material combined. When the proportion of the recording material is too high, the absorption coefficient becomes high, that is, high reflectivity from the disk is not obtained because of the less interference effect. Therefore high modulation is not performed between the ceystalline and armorphous states. When the proportion of the recording material is less than 50% by volume, the absorption coefficient of the recording layer becomes low and the linkage of the crystalline phase clusters is not mature. That is, the opticla phase change can not happen well.

While the recording material generally has an imaginary part of the refractive index, k, of about 3.3 in crystalline state and about 2.2 in microcrystalline or amorphous state as mentioned above, a recording layer of a recording material/dielectric material mixture=3/1 in volume ratio would have the index k of about 1.2 in crystalline state and about 0.6 in microcrystalline or amorphous state.

The recording layer may have any desired thickness although a thickness of about 100 to 2,000 Å, especially about 150 to 1,500 Å is preferred for reflectivity and modulation.

The recording layer may be formed by any desired method, for example, sputtering and evaporation. A recording layer containing both a recording material and a dielectric material is preferably formed by a multiple source sputtering technique using a plurality of targets, typically a target of recording material and a target of dielectric material. With these targets set to face a substrate, sputtering is carried out while rotating the substrate relative to the targets. The rotational speed of the substrate relative to the targets preferably ranges from 1 to 10 rpm. A slower speed would fail to achieve uniform dispersion of both the materials in the layer whereas a faster speed would provide a high degree of dispersion to inhibit crystal growth and the linkage upon crystallization. Alternatively, a composite target containing both recording and dielectric materials may also be used. The recording layer formed by sputtering is generally believed as having a structure wherein particles of the dielectric material are dispersed in the recording material.

As shown in FIG. 1, there is illustrated one preferred configuration of the optical recording medium according to the present invention. The optical recording medium 1 has a lower dielectric layer 3, a recording layer 4, an upper dielectric layer 5, a reflective layer 6, and a protective layer 7 on a substrate 2.

Since the optical recording medium is adapted to be recorded and reproduced by directing a light beam to the recording layer 4 through the substrate 2, the substrate 2 is preferably formed of a material substantially transparent to such a light beam, for example, resins and glass. For ease of handling and low cost, resins are preferred substrate materials. A choice may be made among various resins such as acrylic resins, polycarbonate, epoxy resins and polyolefins. The shape and dimensions of the substrate are not critical although it is generally of disk shape having a diameter of about 50 to 360 mm and a thickness of about 0.5 to 3 mm. The substrate surface may be provided with a predetermined pattern of grooves for tracking and addressing purposes.

The dielectric layers play the role of protecting the recording layer and confine the thermal expansion of the melting state when a light beam is irradiated, and quickly release the heat to a meltal reflector in order to solidify the amorphous state. The lower and upper dielectric layers 3 and 5 are made of any desired dielectric material, for example, selected from those exemplified for the dielectric material contained in the recording layer, preferably those having a relatively high refractive index. The lower dielectric layer 3 is about 500 to 3,000 Å thick and the upper dielectric layer 5 is about 100 to 500 Å or about 800 to 2,000 Å thick. Higher modulation is available with these thickness ranges at light wavelength of 700-850 nm. Where the upper dielectric layer 5 is about 100 to 500 Å thick, the recording layer becomes of the so-called rapid cooling structure that the cooling rate upon recording is designed to be the highest, ensuring formation of recorded marks having a clear shape with low jitter. Where the upper dielectric layer 5 is about 800 to 2,000 Å thick, the recording layer becomes of the so-called gradual cooling structure that the cooling rate upon recording is relatively lower than that of rapid cooling structure. This structure has an advantage to record and erase with lower laser power, however, disadvantage for repetition times and relatively smaller modulation. The dielectric layers are preferably formed by gas phase growth methods such as sputtering and evaporation.

The reflective layer 6 may be formed of any desired material, typically high reflectivity metals, for example, Al, Au, Ag, Pt, and Cu alone or alloys containing at least one of these metals. The reflective layer is preferably about 300 to 1,500 Å thick. Total reflectivity back through the substrate with the layers above would be lower by transmission through the reflective layer if the thickness is thinner than the range. A thickness beyond this range would provide no additional improvement in reflectivity and increase the production cost. The reflective layer is preferably formed by gas phase growth methods such as sputtering and evaporation.

The protective layer 7 is provided for improving scratch resistance and corrosion resistance. Preferably the protective layer is formed of organic materials, typically radiation curable compounds or compositions which are cured with radiation such as electron and UV radiation. The protective layer is generally about 0.1 to 100 μm thick and may be formed by conventional techniques such as spin coating, gravure coating, spray coating, and dipping.

In another preferred embodiment of the invention wherein the optical recording medium has a sufficiently high reflectivity to carry out reproduction in accordance with the CD standard, the lower dielectric layer includes at least one laminate consisting of two dielectric laminae having different refractive indices. The dielectric lamina having a higher refracive index in the laminate is disposed adjacent to the substrate.

Figure 2:
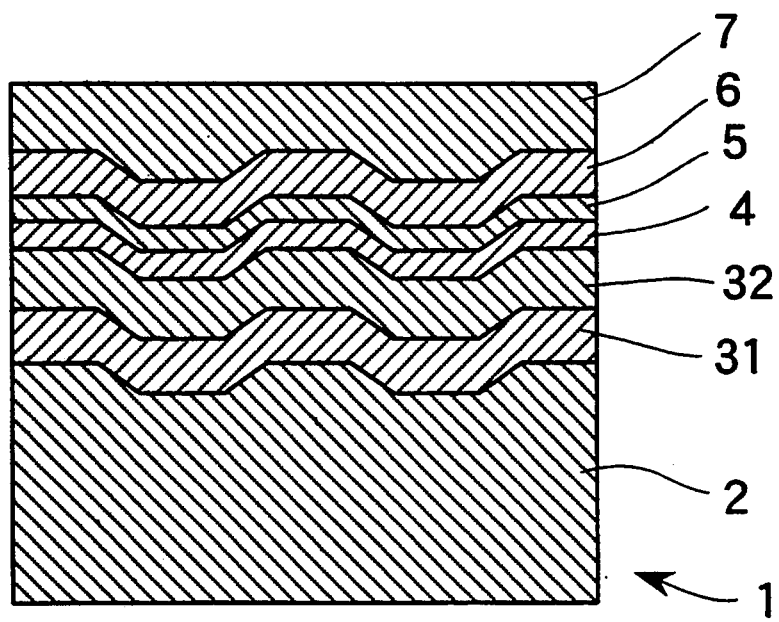
FIG. 2 is a fragmental cross-sectional view of an optical recording medium according to another preferred embodiment of the invention.

FIG. 2 shows one preferred configuration for this embodiment. The optical recording medium 1 is shown as having a dielectric layer with a higher refractive index 31, a dielectric layer with a lower refractive index 32, a recording layer 4, an upper dielectric layer 5, a reflective layer 6, and a protective layer 7 on a substrate 2. In this configuration, the high refractive index dielectric layer 31 and a lower refractive index dielectric layer 32 constitutes the laminate.

The dielectric material of which the high refractive index layer 31 is made should preferably have a relatively higher refractive index like the dielectric material to be contained in the recording layer, typically the index of at least 2 as measured at a wavelength of 400 to 850 nm. The dielectric material of which the low refractive index layer 32 is made should preferably have a relatively lower refractive index, typically the index of less than 2 as measured at a wavelength of 400 to 850 nm. Useful dielectric materials include $SiO_2$, $MgF_2$, $CaF_2$, $LiF_2$ and mixtures thereof. It will be understood that reflectivity is further improved by providing more than one such laminate. In practice, however, one or two laminates are preferred because a larger nuttier of laminates reduce modulation. Also it may be possible to make a dielectric layer with λ/2 optical thickness on the laminate because of no effect on the intereference.

Preferably, the high refractive index layer 31 is about 500 to 1,500 Å thick and the low refractive index layer 32 is about 300 to 1,500 Å. Where two laminates are provided, the laminate on the substrate side includes a high refractive index layer of about 750 to 900 Å thick, more preferably 800 to 850 Å thick and a low refraction index layer of about 400 to 500 Å thick, and the other laminate on the recording layer side includes a high refractive index layer of about 750 to 900 Å thick, more preferably 800 to 850 Å thick and a low refractive index layer of about 1,000 to 1,400 Å thick, more preferably 1,200 to 1,300 Å thick.

The substrate 2, recording layer 4, upper dielectric layer 5, reflective layer 6 and protective layer 7 are the same as those of FIG. 1. As mentioned above, it may be possible to make on the dielectric layer a high refractive index layer with a λ/2 optical thickness because this layer has no role for optical interference. The recording layer is preferably about 150 to 500 Å thick when formed solely of a recording material and about 200 to 1,000 Å thick when formed of a mixture of recording and dielectric materials. The upper dielectric layer is formed of a dielectric material having a relatively high refractive index of at least 2.

Described below is how to operate the optical recording medium of the invention for recording and reproduction.

In the optical recording medium of the invention, the recording layer has crystallized over the entire area in an initialized state. When a recording light beam, typically laser beam is directed to the recording layer in crystalline state and is focused on the surface. Then the recording material is melted within the irradiated spot. After removal of the recording light beam, the temperature of the spot decreases quickly so that the molten spot is subsequently solidified to amorphous or microcrystalline to form a signal recorded mark. Since the recording layer has a a slower crystallization time or speed than the cooling rate or time of the recording layer by the structure of the present invention, the optical recording medium of the present invention ensures high contrasted reflectivity change between the signal recorded marks and the other area and high C/N even when the rotational speed of the recording layer relative to the recording light beam is low and the cooling rate of the irradiated spot is relatively low.

When it is desired to rewrite the recorded information, a recording light beam is directed to a spot of the recording layer where a signal is to be newly written while an erasing light beam is continuously directed to the remaining spots. The spots where the erasing light beam is irradiated are heated, however, the temperature is relatively low and below the melting point of the recording material because the erasing light beam is set to relatively low power as compared with the recording light beam in order not to melt the material. When the erasing light beam is irradiated over a wide area, the resultant heat accumulation provides a gradual temperature cooling so that the cooling rate of the layer is slower than the crystallization time or speed, allowing for crystallization. When the recording spot is once melted upon exposure to the recording light beam, the spot remains in the amorphous or microcrystalline state because the heat is quickly diffused toward the reflective layer through an upper dielectric layer to solidity the amorphous mark. Accordingly, upon rewriting, whether the recording material is crystalline or amorphous (or microcrystalline) before irradiation, those portions irradiated with the recording light beam all become amorphous (or microcrystalline) and those portions irradiated with the erasing light beam all become crystalline. Simple overwrite recording is done in this way. However, such overwrite recording can be carried out by using one single light beam which is modulated into recording and erasing light beam power.

Preferably the recording light beam is emitted in pulses. By recording a single signal with two or more divided into pulse trains irradiation, the heat accumulation at the recording spot is dispersed quickly in the separated time interval. A teardrop shape mark, which decreases C/N and increases jitter, is greatly improved by this effect. The pulse irradiation also provides an increase of erasing rate.

It is to be noted that the same as above applies for the transition between amorphous and cystalline states of the recording material caused by a single light beam irradiation where the recording layer contains a dielectric material.

The power Pw of the recording light beam and the power Pe of the erasing light beam may be empirically determined. Preferred ranges of Pw and Pe are as follows. In the configuration of FIG. 1 wherein the recording layer is formed of a recording material alone or a mixture of recording and dielectric materials, Pw is at least 12 mW and Pe is 4 to 7 mW for the upper dielectric layer which is thin and of the rapid cooling system, type and Pw is 8 to 14 mW and Pe is 2 to 4 mW for the upper dielectric layer which is thick and of the gradual cooling system. In the configuration of FIG. 2 wherein the recording layer is formed of a recording material alone, Pw is at least 30 mW and Pe is 18 to 25 mW for the upper dielectric layer of the rapid cooling system and Pw is 15 to 20 mW and Pe is 8 to 10 mW for the upper dielectric layer of the gradual cooling system. In the configuration of FIG. 2 wherein the recording layer contains a dielectric material, Pw is at least 30 mW and Pe is at least 20 mW for the upper dielectric layer of the rapid cooling system and Pw is 12 to 18 mW and Pe is 6 to 10 mW for the upper dielectric layer of the gradual cooling system.

The reproducing light beam should be of a low power which does not affect the crystallographic state of the recording layer. Understandably the signal recorded portions in amorphous or microcrystalline state give lower reflectivity than the unrecorded portions in crystalline state.

Preferably the optical recording medium of the invention is operated by rotating it to provide a relative speed of the recording layer relative to the respective light beams of about 1.2 to 2.8 m/s, especially 1.2 to 1.4 m/s equal to the linear velocity for the CD. Satisfactory C/N and repetitive recording characteristics are available at such a linear velocity. When the relative speed exceeds more than 2.8 m/s, the cooling rate of the recording layer becomes closer or equal to the crystallzation time or speed. Therefore, the erasability is getting worse. When the relative speed becomes slower than 1.2 m/s, the cooling rate is slower and the recorded marks are gradually crystallized by the accumulated heat in the film.

EXAMPLE

Examples of the present invention are given below by way of illustration and not by way of limitation.

EXAMPLE 1

A cleaned silicon substrate was placed in a sputtering apparatus. The chamber was evacuated to a vacuum of about $3 \times 10^{-3}$ Pa, and RF sputtering was carried out with a power of 2.2 W/cm² until a recording layer of 200 Å was deposited. The target used was an antimony (Sb) target having chips of Ag, In, Te and V attached to the surface thereof. The composition ratio of the sputtered recording film was analyzed by inductively coupled plasma (ICP) spectrometry, which is reported as sample No. 1 in Table 1 below.

Next, a silicon dioxide ($SiO_2$) film of 1,000 Å thick was formed on the recording layer by sputtering for preventing the recording layer from oxidation. At the end of sputtering, the sample was taken out to the ambient air, heated at 250° C. for 5 minutes in an oven, and then cooled down. Scotch tape was applied to the silicon dioxide film surface, the sample was entirely immersed in diffusion pump oil where the tape was peeled from the sample. At this point, the silicon dioxide film was stripped from the recording layer surface together with the tape.

Figure 3:
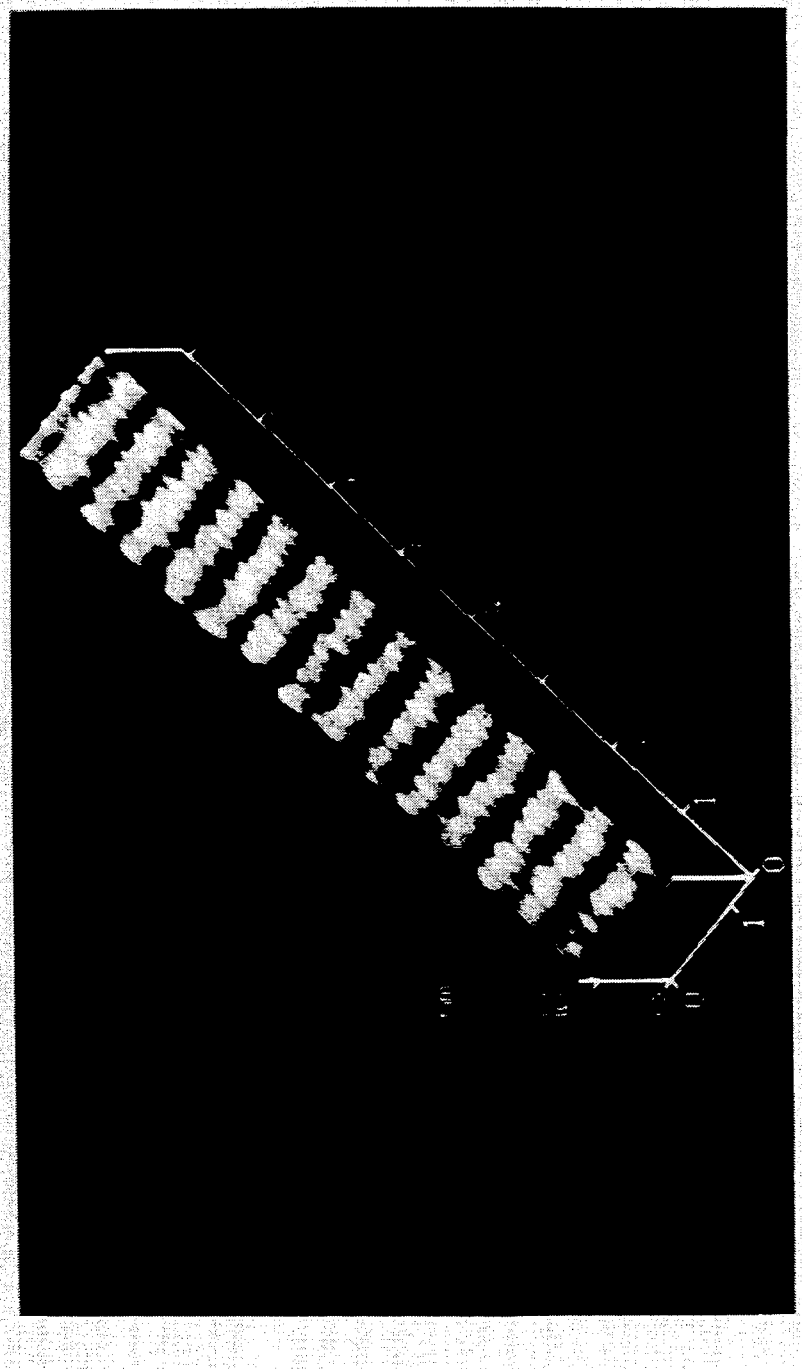
FIG. 3 is a STM photomicrograph of the surface of the recording layer formed in Example 1 showing a crystalline structure.

In the oil, the recording layer surface was examined by means of a scanning tunnel microscope (STM). The voltage between the STM tip and the substrate was −0.05 V and the current was 1.2 nA. FIG. 3 is a STM photomicrograph of the recording layer surface, which indicates crystallization of the recording material.

Separately, a disk-shaped substrate 2 was injection molded from polycarbonate to a diameter of 133 mm and a thickness of 1.2 mm while grooves were simultaneously formed on one major surface thereof. On the grooved surface of the substrate 2, a lower dielectric layer 3, a recording layer 4, an upper dielectric layer 5, a reflective layer 6 and a protective layer 7 were successively formed, fabricating an optical recording disk sample of the configuration shown in FIG. 1 wherein the recording layer had the composition shown in Table 1. The lower and upper dielectric layers were formed to a thickness of 2,000 Å and 200 Å, respectively, by sputtering ZnS and $SiO_2$ targets. The molar ratio of $ZnS:SiO_2$ was 0.85:0.15. These dielectric layers had an refractive index of 2.3 at the wavelength of 780 nm. The recording layer was formed to a thickness of 220 Å by RF sputtering in the same manner as above. The reflective layer was formed to a thickness of 1,000 Å by sputtering a Au target. The protective layer was formed by applying a UV curable resin by spin coating and exposing to UV radiation for curing. The protective layer was 5 μm thick at the end of curing.

Next, for initialization, continuous, that is, non-modulated d.c. laser light of 7.0 mW was irradiated to the as deposited recording layer through the substrate at relatively the same speed as CD speed or less, thereby causing the recording layer to crystallize.

While each disk sample was rotated at a linear velocity of 1.4 m/s corresponding to the CD standard, the disk sample was recorded with CD signals which were 11T signals of 196 kHz and then the recorded signals were reproduced for measuring the C/N contrast. Overwriting of 11T signals was repeated 100 times by one beam laser light modulated with writing and erasing power levels before C/N measurement. The recording power level Pw and erasing power level Pe was 13.0 mW and 6.0 mW, and the reproducing light beam had a power Pr of 1.0 mW. The laser beam applied had the wavelength of 780 nm.

The samples were measured for modulation. Modulation (Mo) was determined as (unrecorded portion reflectivity—recorded portion reflectivity)/unrecorded portion reflectivity.

Also the samples were measured for erasing rate. Erasing rate was C/N which is of remained 11T C/N after 3T signals are over written on 11T marks. Erasing rate after pulse recording was also determined. The pulse recording was to record 11T signals divided into 8 pulses of rectangular wave having a duty factor of 50%.

The results are shown in Table 1.

TABLE 1

| Sample | | C/N (dB) | | | Erasing rate (dB) | |
|---|---|---|---|---|---|---|
| No. | Composition (atomic ratio) | Initial | Overwrite | Mo (%) | Continuous | Pulse |
| 1 | $[(Ag_{0.278}In_{0.061}Te_{0.661})_{0.463}Sb_{0.537}]_{0.996}V_{0.004}$ | 62 | 56 | 62 | −27 | −35 |

TABLE 1-continued

| Sample No. | Composition (atomic ratio) | C/N (dB) Initial | C/N (dB) Overwrite | Mo (%) | Erasing rate (dB) Continuous | Erasing rate (dB) Pulse |
|---|---|---|---|---|---|---|
| 2 | $[(Ag_{0.323}In_{0.054}Te_{0.623})_{0.441}Sb_{0.559}]_{0.995}V_{0.005}$ | 60 | 55 | 60 | −27 | −33 |
| 3* | $[(Ag_{0.280}In_{0.08-2}Te_{0.638})_{0.481}Sb_{0.519}]_{0.9995}V_{0.0005}$ | 59 | 37 | 65 | −23 | −20 |
| 4* | $[(Ag_{0.286}In_{0.077}Te_{0.637})_{0.473}Sb_{0.527}]_{0.733}V_{0.267}$ | 53 | 36 | 32 | −22 | −22 |

*outside the scope of the invention

The effectiveness of the invention is evident from Table 1. Those samples containing vanadium within the specific range provide high C/N and high modulation and maintains the C/N after repetitive overwriting. They also provide a satisfactory erasing rate since an erasing rate of below −25 dB is generally regarded acceptable. Excellent erasing rates were obtained when pulse recording was carried out.

Equivalent results were obtained when Bi substituted for part or all of Sb. Equivalent or better results were obtained when Ti substituted for part or all of vanadium. When Au substituted for part or all of Ag, the crystallization rate somewhat increased as compared with the sole use of Ag, but equivalent results to the sole use of Ag were obtained by increasing the amount of vanadium added. Satisfactory results were obtained when part or all of vanadium was replaced by at least one element of Zr, Hf, Nb, Ta, Mn, W and Mo.

The samples within the scope of the invention shown in Table 1 and comparative samples free of vanadium were stored under conditions: 80° C. and RH 80% for examining deterioration of the recording layer. The vanadium-containing inventive samples remained unchanged over 200 hours of storage whereas the comparative samples showed deterioration in the recording layer after 20 hours. That is, the recording layer in amorphous state underwent crystallization and thus had a reflectivity approximate between the reflectivity in unrecorded and crystalline state.

EXAMPLE 2

An optical recording disk sample of the configuration shown in FIG. 2 was fabricated. The high refractive index layer was of the same material as the dielectric layer of Example 1 and 800 Å thick. The low refractive index layer was of SiO$_2$ sputtered to a thickness of 1,200 Å and had an refractive index of 1.45 at the wavelength of 780 nm. The recording layer had the same composition as sample No. 1 in Table 1 and formed to a thickness of 200 Å by sputtering. The upper dielectric layer was of the same material as in Example 1, but of the gradual cooling structure by increasing its thickness to 1,600 Å for increasing recording sensitivity because otherwise this sample had a high reflectivity and the recording layer became less efficient in light absorption. The remaining components were the same as in Example 1.

The sample was determined for reflectivity and modulation by the same pulse recording method as in Example 1. The recording light beam power level Pw was 18.0 mW and the erasing light beam Pe power level was 8.0 mW. As a result, the unrecorded portion (in crystalline state) had a reflectivity of 66% (the CD standard requires 65% or higher) and a modulation of 62% (the CD standard requires 60% or higher), both satisfying the CD standard. EFM signals as typical CD signals were recorded in the sample to find that the signals could be reproduced by a CD player. The erasing rate was below −25 dB and the jitter was below 25 nsec. after 100 overwrite recording cycles.

EXAMPLE 3

An optical recording disk having a recording layer containing a dielectric material was fabricated. The recording layer was formed by sputtering while using a first target as used for the recording layer of sample No. 1 and a second target as used for the dielectric layer in Example 1 and rotating the substrate at 5 rpm. DC sputtering was applied to the recording material and RF sputtering to the dielectric material. The recording layer consisted of the recording material and the dielectric material in a volume ratio of 3/1 and was 400 Å thick.

The disk had the configuration of FIG. 2. The high index of refraction layer, low index of refraction layer and upper dielectric layer were of the same materials as in Example 2 and had a thickness of 800 Å, 1,000 Å and 1,600 Å, respectively.

These samples were evaluated as in Example 2. The recording light beam had 18.0 mW Pw and the erasing light beam had power level Pe 8.0 mW. As a result, the unrecorded portion (in crystalline state) had a reflectivity of 70% and a modulation of 68%, which were both better than Example 2. The erasing rate was below −25 dB and the jitter was fully low, i.e., below 25 nsec. after 100 overwrite recording cycles.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical recording medium comprising a recording layer on a substrate wherein information is recorded and erased by exposing the recording layer to a light beam for causing the recording layer to change its crystallographic state, said recording layer comprising a recording material containing A, B, C, MI, and MII wherein A is at least one of Ag and Au, B is In, C is at least one of Te and Se, MI is at least one of Sb and Bi, and MII is at least one element selected from the group consisting of Ti, Zr, Hf, V, Nb, Ta, Mn, W and Mo, the atomic ratio of the respective elements in the recording material being represented by the formula:

$$[(A_aB_bC_{1-a-b})_xMI_{1-x}]_{1-y}MII_y$$

wherein letters a, b, x and y are in the ranges: $0.01 \leq a < 0.50$, $0.01 \leq b < 0.50$, $0.30 \leq x \leq 0.70$, and $0.001 \leq y \leq 0.20$.

2. The optical recording medium of claim 1, comprising on the substrate, a lower dielectric layer having a thickness of 500 to 3000 Å, the recording layer, an upper dielectric layer having a thickness of 100 to 500 Å and a reflective layer in the described order.

3. The optical recording medium of claim 2 wherein said lower dielectric layer includes at least one laminate consisting of two dielectric laminae having different refractive indices, the dielectric lamina having a higher refractive index in the laminate being disposed adjacent to the substrate.

4. The optical recording medium of claim 3 wherein in said laminate, one dielectric lamina has a refractive index of at least 2 and the other dielectric lamina has a refractive index of less than 2 as measured at a wavelength of 400 to 850 nm.

5. The optical recording medium of claim 2 wherein said upper dielectric layer has a refractive index of at least 2 as measured at a wavelength of 400 to 850 nm.

6. The optical recording medium of claim 2 further comprising a protective layer containing an organic material on the reflective layer.

7. The optical recording medium of claim 1 which is rotated such that the linear velocity of the recording layer relative to the light beam is 1.2 to 2.8 m/s.

8. The optical recording medium of claim 1 wherein said recording layer further contains a dielectric material.

9. The optical recording medium of claim 8 wherein the dielectric material in said recording layer has a refractive index of at least 1.4 as measured at a wavelength of 400 to 850 nm.

10. The optical recording medium of claim 8 wherein in said recording layer, the recording material is at least 50% by volume of the recording material and the dielectric material combined.

11. A method for preparing an optical recording medium according to claim 8, comprising the step of:
    forming the recording layer on the substrate by a multiple source sputtering technique using a target of the recording material and a target of the dielectric material, while rotating the substrate at a rotational speed of 1 to 10 rpm relative to the respective targets.

* * * * *